Oct. 12, 1965 J. ZOLTAI 3,211,845

ONE-THOUSAND POSITION SWITCH

Filed April 20, 1962 6 Sheets-Sheet 1

INVENTOR.
John Zoltai
BY Lane & Aitken
Attorneys.

INVENTOR.
John Zoltai
BY
Lane & Aitken
attorneys.

Oct. 12, 1965 J. ZOLTAI 3,211,845

ONE-THOUSAND POSITION SWITCH

Filed April 20, 1962 6 Sheets-Sheet 3

INVENTOR.
John Zoltai

BY Lane & Aitken
attorneys

Oct. 12, 1965 J. ZOLTAI 3,211,845

ONE-THOUSAND POSITION SWITCH

Filed April 20, 1962 6 Sheets-Sheet 4

INVENTOR.
John Zoltai
BY
Lane & Aitken
attorneys.

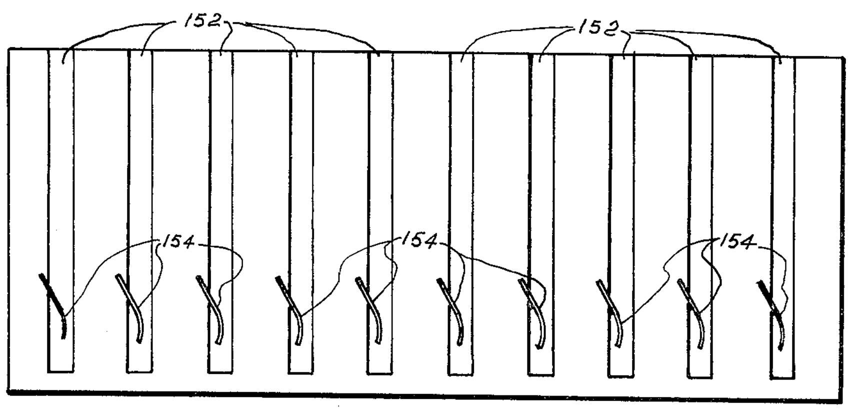
Fig. 6.
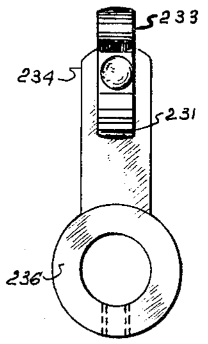
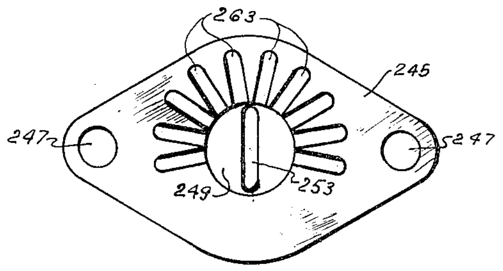
Fig. 7. Fig. 8.
INVENTOR.
John Zoltai
BY
Lane & Aitken
attorneys.

Oct. 12, 1965 J. ZOLTAI 3,211,845

ONE-THOUSAND POSITION SWITCH

Filed April 20, 1962 6 Sheets-Sheet 6

INVENTOR.
John Zoltai

BY Lane & Aitken
attorneys.

United States Patent Office 3,211,845

Patented Oct. 12, 1965

3,211,845
ONE-THOUSAND POSITION SWITCH

John Zoltai, 100 Artist Road, Santa Fe, N. Mex.

Filed Apr. 20, 1962, Ser. No. 189,043
9 Claims. (Cl. 200—4)

This invention relates to multi-position switches, and more particularly to a switch which has the function of selecting one out of a large number of circuits to have a source of power applied directly thereacross.

Prior to the present invention, the selecting of one circuit out of a large number of circuits either required a power-consuming electronic switching device or a large cumbersome mechanical device. Both of the above types of devices are expensive and need frequent repair which is often tedious and time-consuming.

The present invention is a small mechanical switch which performs the function of selecting one circuit out of a large number of circuits. Because the switch of the present invention is completely mechanical, it overcomes the disadvantages of electronic switching devices, and yet the switch of the present invention is small in size. Moreover, the switch of the present invention is inexpensive and does not require frequent repair. When and if repair is required, the repair can be accomplished quickly and easily.

The switch of the present invention comprises a plurality of nearly identical printed circuit cards to which selective connections are made by the angular positioning of a plurality of shaft assemblies. The shaft assemblies are operated manually by control knobs. A large number of circuits can be connected to the printed circuit cards and by the positioning of the shaft assemblies one of the circuits will be selected. The selected circuit is connected by the switch directly across a source of power.

The construction of the switch results in a low cost of manufacture for the switch. The printed circuit cards are easily removable, thus facilitating the replacement thereof or the rewiring or checking of connections thereon. When one of the shaft assemblies is being rotated from one position to another, the electrical contacts carried by the shaft assembly do not touch the contacts on the printed circuit cards. This feature results in much longer life for the contacts of the switch and also permits digital selection to be made without passing through intermediate digital positions. Even though the contacts carried by the shaft assemblies do not engage contacts on the printed circuits when they are being rotated, the contacts carried by the shaft assemblies wipe against the contacts on the printed circuit cards when the contacts are engaged. Because of this action, the contacts are self-cleaning. Each shaft is locked in position by an indexing device when the contacts carried by the shaft assemblies engage the contacts on the printed circuit cards. This feature ensures that there is no misalignment of the shaft assemblies and prevents accidental turning of the shaft assemblies when the contacts are engaged.

Further objects and advantages of the present invention will become apparent as the following detailed description of the invention unfolds, and when taken in conjunction with the accompanying drawings, wherein:

FIG. 6 is a view of the inside face of a side plate of the switch used to house the printed circuit cards and make electrical connections thereto;

FIG. 7 illustrates one of the wipers carried by the shaft assemblies;

FIG. 8 illustrates one of the latch housings used to index the shaft assemblies and lock them in position.

Figure 2:
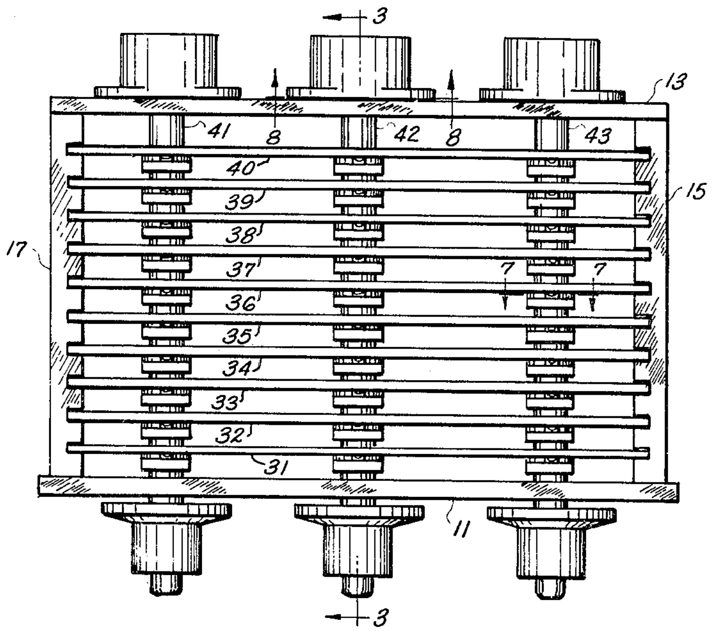
FIG. 2 is a top plan view of the switch.
Figure 1:
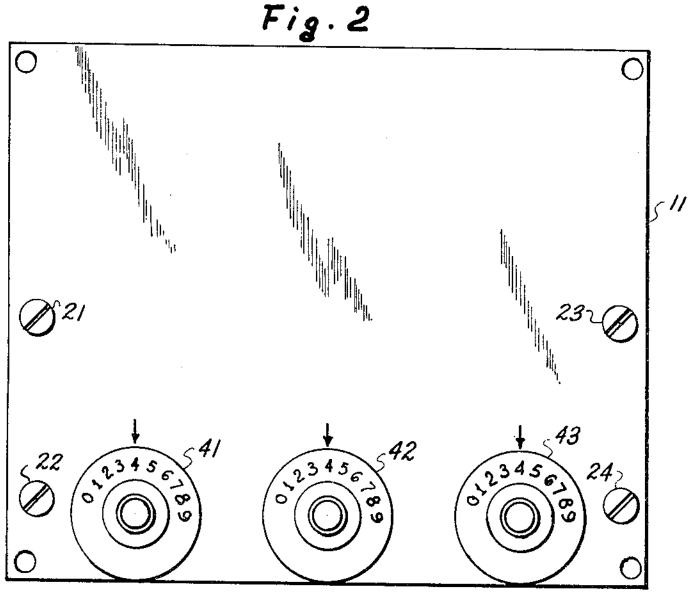
FIG. 1 is a front view in elevation of the switch.
Figure 3:
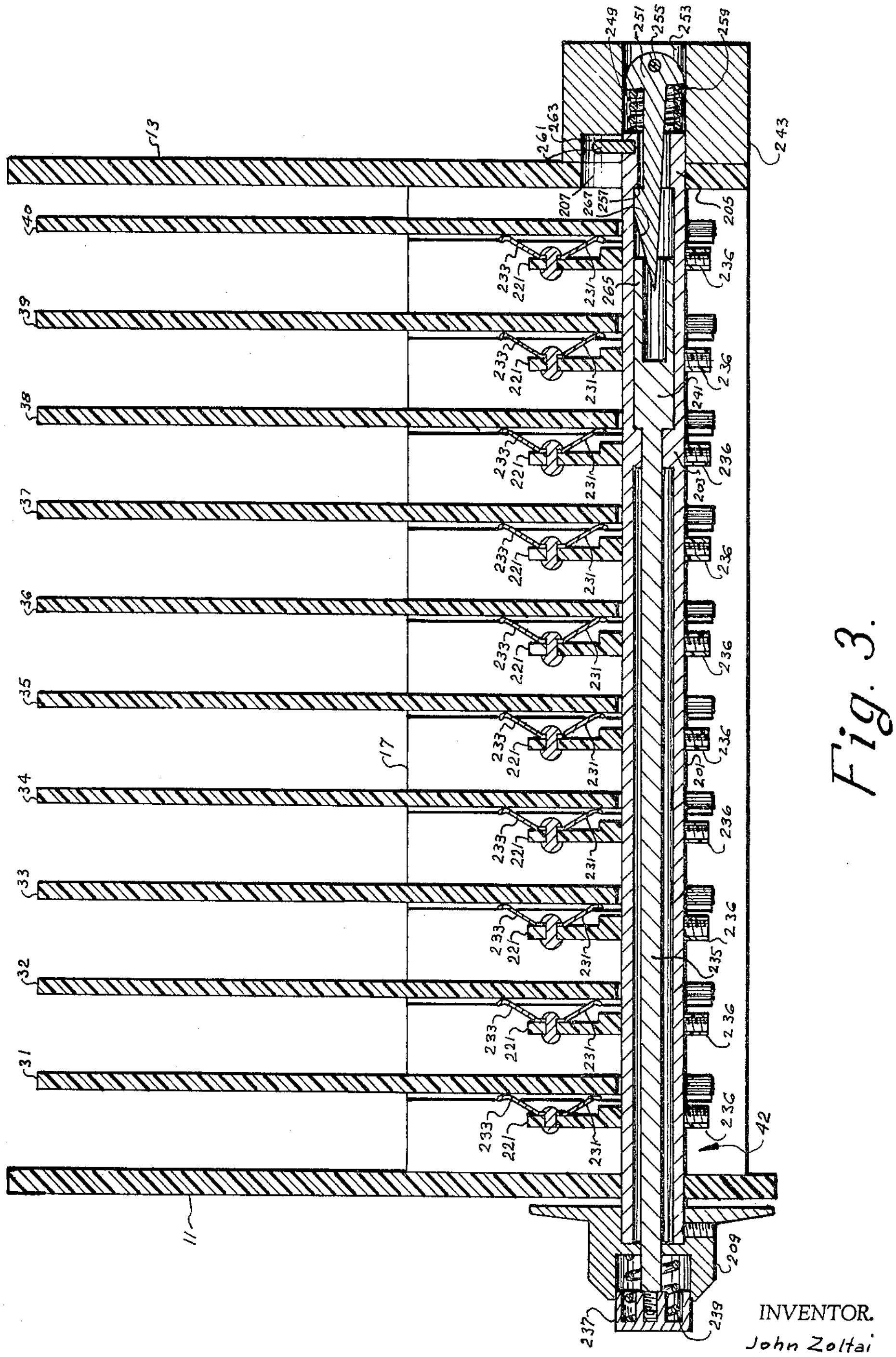
FIG. 3 is a sectional view of the switch taken along the lines 3—3 of FIG. 2.
Figure 4:
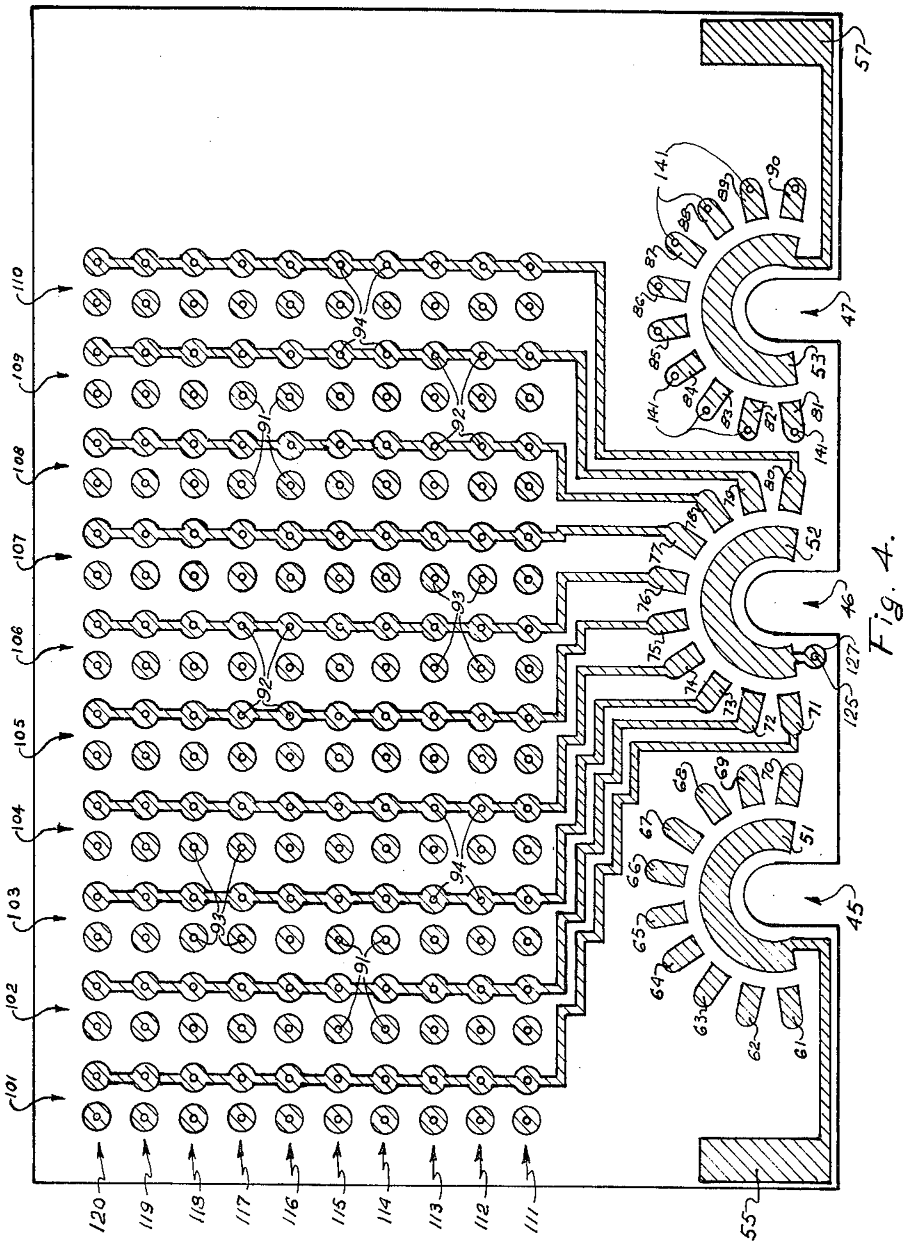
FIG. 4 shows a front view of one of the printed circuit cards of the switch.
Figure 5:
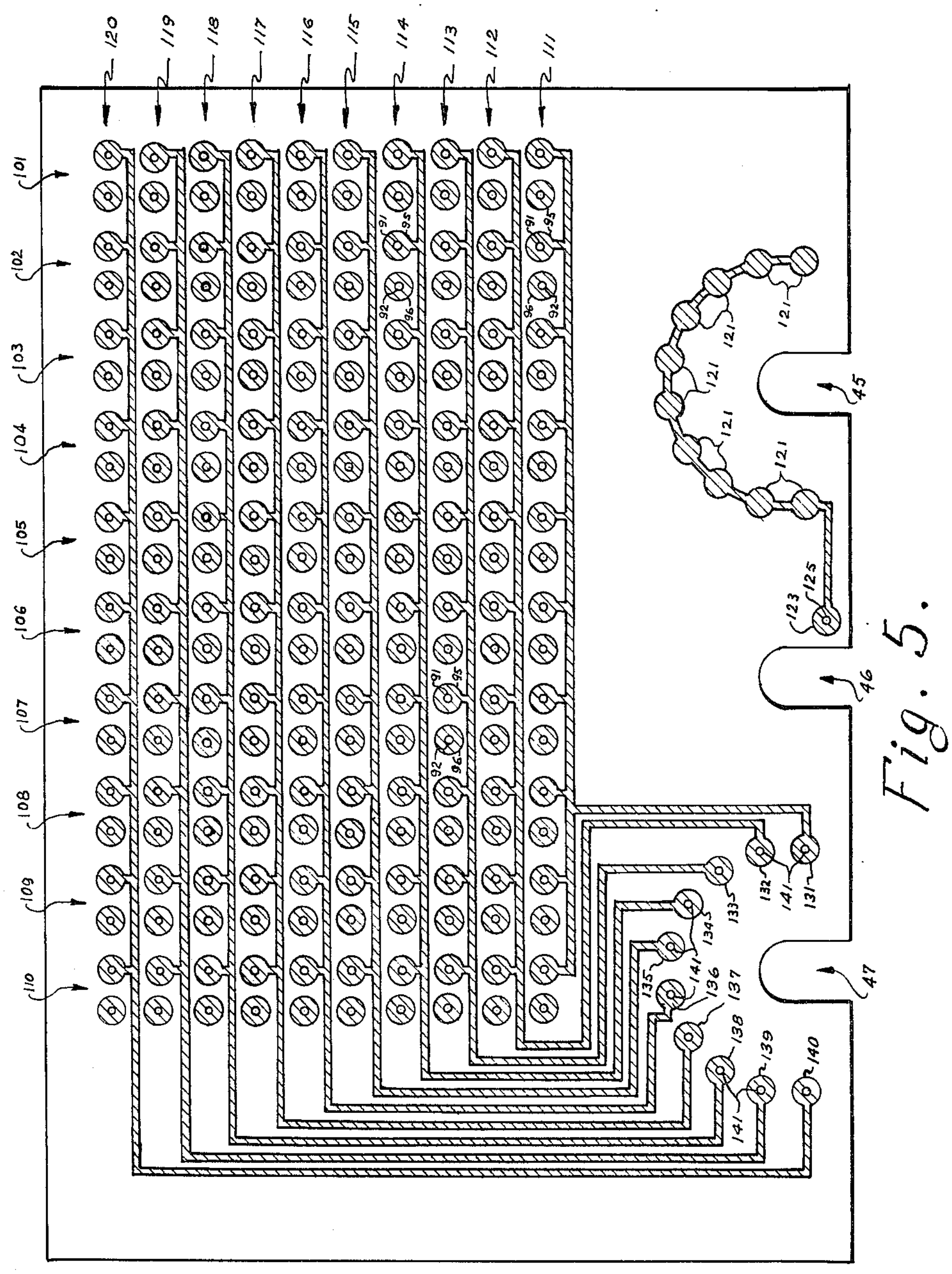
FIG. 5 shows a back view of one of the printed circuit cards of the switch.

As shown in FIGS. 1 through 3, the switch of the invention comprises a front panel 11 and an end plate 13 which are separated by side plates 15 and 17. The side plates 15 and 17 are fastened to the front panel 11 by means of screws 21 through 24. A corresponding set of screws fastens the side plates 15 and 17 to the end plate 13. Within the enclosure defined by the front panel 11 and the end and side plates 13, 15 and 17 are mounted ten printed circuits cards 31 through 40. Three shaft assemblies 41, 42 and 43 are provided extending through the front panel 11, through the assembly of the printed circuit cards 31 through 40, and through the end plate 13. The same printed circuit is printed on the front side of each of the printed circuit cards which is the side facing the front panel 11. Similarly, the same printed circuit is printed on the back side of each of the printed circuit cards. These printed circuit cards are shown in more detail in FIGS. 4 and 5, which illustrate the front and back sides, respectively, of one of the printed circuit cards. As shown in FIGS. 4 and 5, each of the printed circuit cards has defined therein three grooves 45 through 47. When the printed circuit cards are assembled in the housing of the switch comprising the front panel 11 and the end and side plates 13, 15 and 17, these grooves 45 through 47 in each printed circuit card will be aligned with the corresponding grooves in the other printed circuit cards. The grooves 45 through 47 serve the purpose of providing clearance for the shaft assemblies 41 through 43, respectively. The use of grooves in the cards to provide clearance for the shaft assemblies instead of holes permits the cards to be easily assembled or replaced. The printed circuits on the cards 31 through 40 comprise copper, which is clad on the cards. The cards themselves are insulating laminates. As shown in FIG. 4, the printed circuit on the front side of each card comprises arcuate conductive segments 51 through 53 positioned above the grooves 45 through 47, respectively, and extending through about 200° around the grooves. On the left side of the card as shown in FIG. 4 there is provided a conductive segment 55 which is connected to the segment 51. On the right hand side of the printed circuit card as shown in FIG. 4 there is provided a conductive segment 57 which is connected to the conductive segment 53. Around the groove 45 above the conductive segment 51 are ten contact lands 61 through 70 angularly spaced approximately 20° apart. Around the groove 46 above the segment 52 are ten contact lands 71 through 80 angularly spaced approximately 20° apart and around the groove 47 above the segment 53 are ten contact lands 81 through 90 angularly spaced approximately 20° apart. Each of the printed circuit cards is provided with 200 plated through holes arranged in pairs. One plated through hole of each pair is designated by the reference number 91, and the other plated through hole of each pair is designated by the reference number 92. Each pair of plated through holes 91 and 92 is a pair of terminals, across which a circuit can be connected. The pairs of plated through holes 91 and 92 are arranged in ten columns 101 through 110 and ten rows 111 through 120. The printed circuit on the front side of the printed circuit card comprises a land 93 around each of the holes 91 and a land 94 around each of the holes 92. The printed circuit on the back side of the printed circuit card as shown in FIG. 5 comprises a land 95 around each of the through holes 91 and a land 96 around each of the through holes 92. The plated through holes 91 severally interconnect the lands 93 and 95 and the plated through holes 92 severally interconnect the lands 94 and 96. The printed circuit on the front side of the printed circuit card connects together all of the lands 94 in the same column. The contact lands 71 through 80 are severally connected by the printed circuit on the front side of the printed circuit card to the interconnected groups of lands 94 in the columns 101 through 110, respectively, so that each of the contact lands 71 through 80 is connected to a group of lands 94 in a different column. The printed circuit on the back side of the printed circuit card comprises a land 121 under each of the contact lands 61 through 70. The lands 121 are interconnected by the printed circuit on the back side of the printed circuit card, and are connected to a land 123 surrounding a plated through hole 125. The plated through hole 125 connects the land 123 to a land 127 surrounding it on the front side of the printed circuit card, which land 127 is connected to the segment 52, so that each of the lands 121 is connected to the segment 52. The printed circuit on the back side of the printed circuit card comprises lands 131 through 140, which are directly under the contact lands 81 through 90, respectively. The lands 131 through 140 are severally connected to the lands 81 through 90, respectively, by plated through holes 141 filled with solder. The printed circuit on the back side of the printed circuit card connects together all of the lands 95 in the same row. The contact lands 131 through 140 are severally connected by the printed circuit on the back side of the printed circuit card to the interconnected groups of lands 95 in the columns 111 through 120, respectively, so that each of the contact lands 131 through 140 is connected to a group of lands 95 in a different column. Each of the printed circuit cards 31 through 40 has the above described printed circuits on the front and back side thereof. In addition to the connections described above, one of the lands 61 through 70 will be connected by means of a plated through hole filled with solder to one of the lands 121. The one of the lands 61 through 70 so connected in each card will be in a different angular position about the groove 45. On the card 31 the land 61 will be connected to one of the lands 121. On the card 32 the land 62 will be so connected. On the cards 33 through 40 the lands 63 through 70, respectively, will be so connected. The shaft assembly 41 situated in the grooves 45 can selectively connect the segment 51 with one of the lands 61 through 70. The connection made by means of the shaft assembly from the segment 51 will be to the same corresponding one of the lands 61 through 70 on each of the printed circuit cards. When the segments 51 are selectively connected to corresponding ones of the lands 61 through 70 on the cards 31 through 40, on one card the segment 51 will be interconnected to the lands 121 by means of the connection through the plated through hole filled with solder. On all the other cards this connection will not be made because there will be no interconnection between the lands 121 and the one of the lands 61 through 70 to which the connection by means of the shaft assembly 41 is made. Thus the shaft assembly 41 selects one of the cards and on this selected card interconnects the segments 51 to the segment 52. The shaft assembly 42 selectively connects the segment 52 on each of the cards to one of the lands 71 through 80 with the corresponding one of the lands 71–80 being selected on each of the cards. Thus on the card selected by the shaft assembly 41 the segment 51 will be connected to the one of the contact lands 71–80 selected by the shaft assembly 42. The shaft assembly 43 selectively connects the segments 53 on each of the printed circuit cards to the same corresponding one of the lands 81 through 90 so that on each of the cards the segment 53 will be interconnected to a selected one of the lands 131 through 140. In accordance with the invention, power is applied to the conducting segment 55 on each of the printed circuit cards and the conducting segment 57 is grounded. This power applied at the conducting portion 55 will be applied to the segment 52 on the selected card, but on all the unselected cards the power will be interrupted between the lands 121 and the segments 61 through 70. Thus on the selected card power will be applied from the segment 52 to the one of the segments 71 through 80 selected by the shaft assembly 42. Therefore the power will be applied to the interconnected lands 94 in one of the columns 101 through 110 and the selection of the column is in effect made by the shaft assembly 42. The conducting segment 57 is connected to ground on each of the printed circuit cards. Thus by means of the selection made by the shaft assembly 43 one of the contact lands 81 through 90 will be grounded. Therefore the lands 95 in a corresponding one of the rows 111 through 120 on each of the cards 31 through 40 will be grounded. In this manner the shaft assembly 43 selects one of the rows 111 through 120. If a circuit is connected across each pair of plated through holes 91 and 92 then that circuit at the intersection of the row selected by the shaft assembly 43 and the column selected by the shaft assembly 42 on the card selected by the shaft assembly 41 will be selected and the source of power applied to the conducting segment 55 on each of the cards will be applied directly across the selected circuit. In this manner the switch of the invention can be operated to select one out of one thousand circuits.

The front panel 11 and the end plate 13 are made of insulating material. The side plates 15 and 17 are made of conducting material and are grooved to receive the printed circuit cards 31 through 40. The inner face of the side plate 17 is shown in FIG. 6. The grooves in the side plate are designated by the reference number 152. The inner face of the side plate 15 is the mirror image of the inner face of the side plate 17 shown in FIG. 6. In each groove 152 of the plate 17 there is included a rhodium plated beryllium copper spring 154 which makes contact with the conducting segment 55 on the printed circuit card received in such groove. The springs 154 connect the segments 55 to the side plate 17. Similarly, the side plate 15 has in its grooves rhodium plated beryllium copper springs which connect the conductive segments 57 on the printed circuit cards to the side plate 15. The power is applied to the conductive segments 55 on the printed circuit cards by means of the side plate 17 and the conductive segments 57 on the printed circuit cards are grounded by means of the side plate 15.

Figure 9:
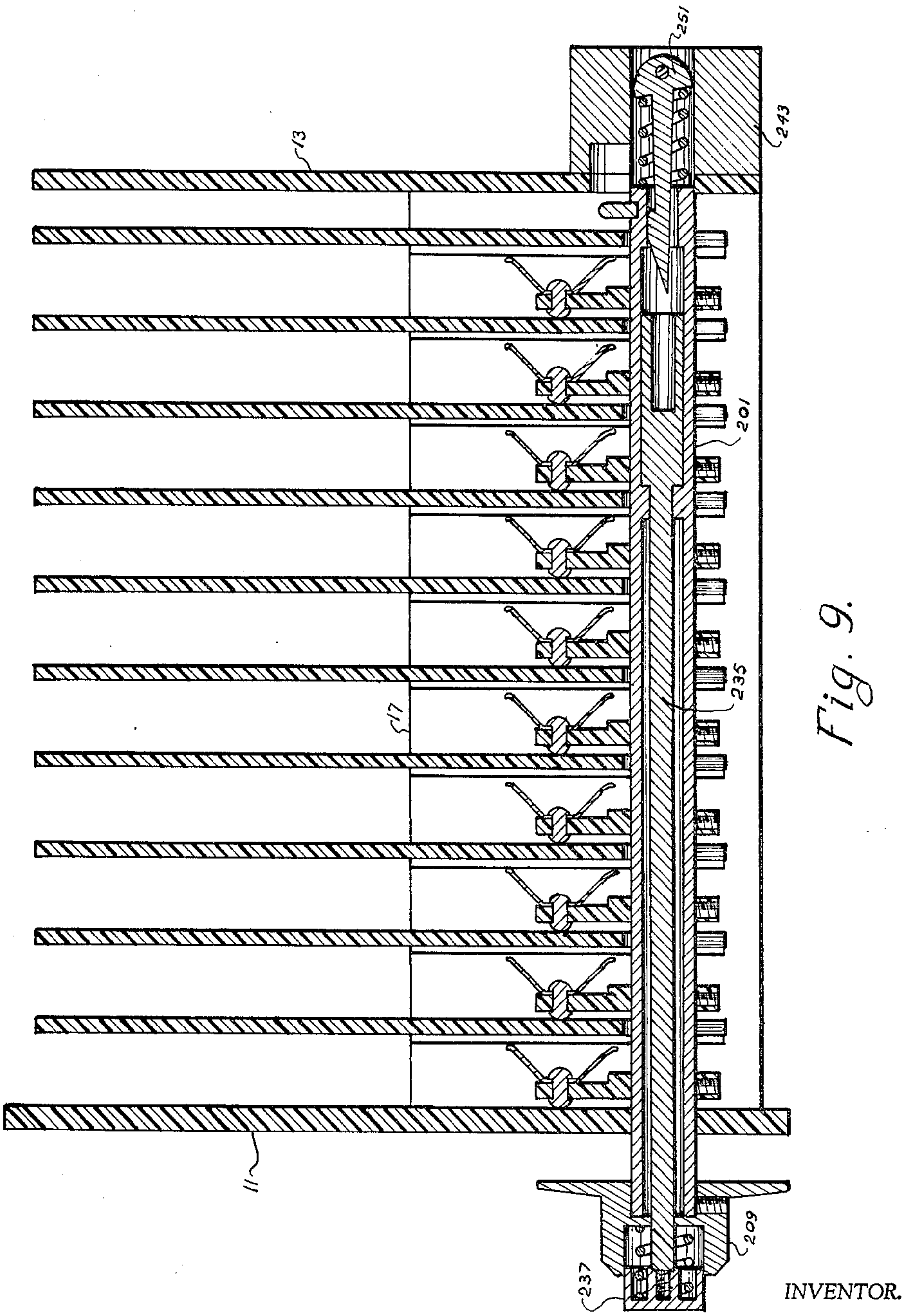
FIG. 9 is the same sectional view as FIG. 3 with the shaft assembly shown therein its released position.

FIG. 3 shows the details of the shaft assembly 42 in cross section. Each of the shaft assemblies 41 and 43 is identical to the shaft assembly 42. As shown in FIG. 3, the shaft assembly 42 comprises a hollow shaft 201 including a retaining ring 203 integral therewith projecting from the inner wall of the shaft 201, and a collar 205 projecting radially inward from the wall of the shaft on the rear end of the shaft, which projects through a hole 207 in the end plate 13. The front end of the shaft 201 projects through the front panel 11 and a knob 209 including a dial is fixed on the front end of the shaft 201 in front of the panel 11. A set of ten wipers 221 are fixed to the shaft 201 spaced along its length. One of the wipers 221 is mounted on the shaft directly in front of each of the printed circuit cards 31 through 40, respectively. One of the wipers 221 is illustrated in FIG. 7. As shown in FIGS. 3 and 7, each of the wipers 221 includes a pair of spring contacts 231 and 233 electrically connected together. The contacts 231 and 233 of each wiper are riveted to an arm 234 extending from a ring 236 fastened to the shaft 201 by means of a set screw. The ring 236 and the arm 234 comprise an integral nylon piece. The contact 231 on each of the wipers 221 of the shaft assembly 42 is adapted to make contact with the conductive segment 52 on the cards 31 through 40. The contact 233 on each wiper of the shaft assembly 42 is adapted to make contact with one of the lands 71 through 80 on each printed circuit card, thus connecting one of the lands 71 through 80 on each card to the segment 52. The one of the contact lands 71 through 80, which is connected in this manner to the segment 52, is selected by the angular position in which the shaft 201 is placed by means of the knob 209. Within the shaft 201 is a release rod 235, the front end of which extends through the knob 209 and is threaded to receive a button 237. A spring 239 is provided in a recess in the knob 209 between the button 237 and the knob 209 urging the release rod 235 in the forward direction, which is to the left as shown in FIG. 3. The release rod 235 is provided with a shoulder 241, which cooperates with the ring 203 to prevent the release rod 235 from being ejected from the shaft 201 by the action of the spring 239. Mounted on the back side of the end plate 13 is a latch housing 243, which encloses the rear end of the shaft 201 extending through the end plate 13. This housing 243 is also shown in FIG. 8, which is a view of the front face of the housing 243 which abuts against the back face of the end plate 13. The housing 243 comprises a plate 245 including mounting holes 247 for mounting the housing on the end plate 13. The shaft 201 is adapted to be received in a cylindrical aperture 249 defined in the housing 243. A latch 251 is pivotally mounted in the housing 243 in a slot 253 by means of a mounting pin 255. The latch 251 is formed from a thin plate of steel and extends from the slot 253 into the cylindrical aperture 249. The slot 253 guides the pivoting of the latch 251 in a plane. The front end of the latch 251 projecting into the cylindrical aperture 249 includes a step 257 which is adapted to engage the collar 205 and secure the shaft 201 against axial movement in a direction towards the front end of the assembly. A coil spring 259 is provided in the cylindrical aperture 249 surrounding the latch 251 and biasing the shaft 201 in a forward direction so that when the step 257 of the latch 251 engages the collar 205 the spring 259 forces the collar 205 against the step 257 of the latch 251. A pin 261 is fixed to the outer wall of the shaft 201 at the rear end thereof projecting radially outwardly. A plurality of locating pin grooves 263 are positioned around the cylindrical aperture 249, and each is designed to receive the pin 261. When the pin 261 is positioned in one of the grooves 263, the groove 263 will secure the shaft 201 against angular rotation, thus holding the wipers 221 in their angular position. By selecting which of the grooves 263 the pin 261 is to be received in, the angular position of the wipers 221 is selected and the one of the contact lands 71 through 80 which is to be connected to the segment 52 on each of the printed circuit cards 31 through 40 is selected. The release rod 235 is formed into a hollow cylinder 265 open at one end behind the shoulder 241. This hollow cylinder 265 is adapted to engage the front end of the latch 251. The front end of the latch 251 is formed with a sloping surface 267 for purposes of engaging the hollow cylinder 265. When the button 237 is depressed against the action of the spring 239, the hollow cylinder 265 will move rearwardly and engage the sloping surface 267 of the latch 251 causing it to pivot in a counter-clockwise direction about the pin 255 as shown in FIG. 3. This will cause the step 257 to disengage the collar 205 and the latch 251 will release the shaft 201. When the shaft 201 is released, it will be moved forwardly by the action of the spring 259 and the pin 261 will be moved out of engagement with the one of the grooves 263 in which it was received. The shaft assembly will then be in the position illustrated in FIG. 9. As shown in FIG. 9, because of the forward movement of the shaft 201, all of the brush contacts on the wipers 221 will be moved out of engagement with the printed circuits on the printed circuit cards 31 through 40, thus the contacts on the entire shaft assembly 42 will be open circuited in the released position shown in FIG. 9. Because the pin 261 is not received in any of the grooves 263, the shaft 201 can be rotated together with the wipers 221 by means of the knob 209 into a new angular position. Then the knob 209 can be depressed, causing the rod 201 to move rearwardly until the step 257 of the latch 251 again engages the collar 205 of the shaft 201. The spring 259 by its action on the latch 251 will urge the latch 251 into its engaged position where the step 257 engages the collar 205. When the latch assembly is thus in its engaged position the contacts 231 and 233 will again make contact between the segments 52 and one of the contact lands 71 through 80 selected by the angular position of the knob 209 and the shaft 201. When the contacts 231 and 233 on the wipers 221 are moved rearwardly into engagement with the segments on the printed circuit cards, the contacts 231 and 233 will wipe against the segments and thus perform a cleaning action. The pin 261 received in one of the grooves 263 will maintain the shaft in this angular position until it is again released by the depression of the button 237. The other shaft assemblies 41 and 43 are identical to the shaft assembly 42 described above and are operated in the same manner to selectively make connections between the segments 51 and the contact lands 61 through 70 and between the segment 53 and the contact lands 81 through 90.

Thus there is provided a low cost, completely mechanical one-thousand position switch. The above description is of a preferred embodiment of the invention, and many modifications may be made thereto without departing from the spirit and scope of the invention, which is defined in the appended claims.

What is claimed is:

1. A multi-position switch comprising a plurality of sheets of insulating material, each of said sheets having a printed circuit thereon, said printed circuit on each of said sheets comprising a plurality of first conducting strips and a plurality of second conducting strips, means for severally connecting a plurality of circuits between different combinations of said first strips and said second strips, selecting means to select one of said sheets, a conducting member, contact means movable between a plurality of positions and making a connection in each of its positions from said conducting member to a different one of said first strips only on the sheet selected by said selecting means, and contact means movable between a plurality of positions and making a connection in each of its positions to a different one of said second strips on each of said sheets.

2. A multi-position switch comprising a plurality of insulating sheets each having a first set of contacts, a second set of contacts, and a conductive segment, a first contact member movable between a plurality of positions, and making a connection to a different one of said first set of contacts in each of its positions on each of said sheets, a second contact member movable between a plurality of positions and connecting said conductive segment on each of said sheets to a different contact of said second set of contacts in each of its positions, conducting means on each of said sheets connecting one of said contacts of said first set to said conductive segment with the other contacts of said first set on such sheet being insulated from said conductive segment.

3. A multi-position switch comprising a plurality of sheets of insulating material, each of said sheets having a printed circuit on the front side thereof and on the back side thereof, said printed circuit on the front side of each of said sheets comprising a plurality of first conducting strips, said printed circuit on the back side of each of said sheets comprising a plurality of second conducting strips, said first strips on each of said sheets being arranged to cross over said second strips on such sheet, means for severally connecting a plurality of circuits between different combinations of said first strips and said second strips at the intersections therebetween, selecting means to select one of said sheets, a conducting member, contact means movable between a plurality of positions and making a connection in each of its positions from said conducting member to a different one of said first strips only on the one of said sheets selected by said selecting means and contact means movable between a plurality of positions and making a connection in each of its positions to a different one of said second strips on each of said sheets.

4. A multi-position switch comprising a plurality of insulating sheets, a plurality of contacts on each of said sheets, a first contact means movable between a plurality of positions and making a connection to a different one of said contacts in each of its positions on each of said sheets, a second contact means movable between a plurality of positions and making a connection to a different one of said contacts in each of its positions on each of said sheets, a plurality of terminals arranged in pairs on each of said sheets, the terminals of each pair being insulated from each other, and printed circuitry on said sheets connected a different one of said pairs of terminals directly between said first and second contact means for each different combination of positions of said first and second contact means.

5. A multi-position switch comprising a plurality of insultating sheets, a plurality of contacts on each of said sheets, a first contact means movable between a plurality of positions and making a connection to a different one of said contacts in each of its positions on each of said sheets, a second contact means movable between a plurality of positions and making a connection to a different one of said contacts in each of its positions on each of said sheets, selecting means to select one of said sheets, a plurality of terminals arranged in pairs on each of said sheets, the terminals of each pair being insulated from each other, and printed circuitry on said sheets connecting a different one of said pairs of terminals on the sheet selected by said selecting means directly between said first and second contact means for each different combination of positions of said first and second contact means.

6. A switching mechanism comprising a housing, a hollow shaft rotatable in said housing and slidably mounted in said housing between first and second axial positions, a contact mounted on said shaft, means to make contact with said contact when said shaft is in said second axial position in a plurality of different angular positions of said shaft, a collar on the end of said shaft, latching means for engaging said collar and holding said shaft in said second axial position, an axially slidable rod within said shaft adapted to engage said latching means and release it from said collar, and means for locking said shaft in its angular position when said shaft is in said second axial position.

7. A switching mechanism as recited in claim 6 wherein said rod includes on one end an open-ended hollow cylinder for engaging said latching means.

8. A switching mechanism as recited in claim 6 wherein said means for locking said shaft includes a pin mounted on said shaft and a plurality of angularly spaced grooves for receiving said pin when said shaft is in said second axial position.

9. A switching mechanism as recited in claim 6 wherein a coil spring surrounds said latching means biasing it into engagement with said collar when said shaft is in said second position, said spring also engaging said shaft when said shaft is in said second axial position urging said shaft towards said first axial position.

References Cited by the Examiner

UNITED STATES PATENTS

| | | | |
|---|---|---|---|
| 1,517,920 | 12/24 | Sachs | 200—78 |
| 1,624,391 | 4/27 | Clausen | 200—11 |
| 2,453,035 | 11/49 | Ponsy | 200—4 |
| 2,616,994 | 11/52 | Luhn | 317—101 X |
| 2,650,270 | 8/53 | Mucher | 200—4 |
| 2,794,081 | 5/58 | Luhn | 317—101 X |
| 2,963,626 | 12/60 | DuVal | 317—101 X |
| 3,058,037 | 10/62 | Naab | 317—101 |
| 3,059,153 | 10/62 | Shaeffer | 317—101 |
| 3,081,416 | 3/63 | Tuttle | 317—101 X |

OTHER REFERENCES

Klippel German application 1,054,130, printed Apr. 2, 1959, 2 pages of spec., 2 sheets of drawings.

KATHLEEN H. CLAFFY, *Primary Examiner.*

BERNARD A. GILHEANY, *Examiner.*